United States Patent
Tock et al.

(10) Patent No.: US 8,429,721 B1
(45) Date of Patent: *Apr. 23, 2013

(54) METHOD AND SYSTEM FOR PERFORMING A SECURITY CHECK

(75) Inventors: Theron Tock, Mountain View, CA (US); Vadim Egorov, Palo Alto, CA (US); Andrew R Harding, Scotts Valley, CA (US); Sampath Srinivas, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 12/604,902

(22) Filed: Oct. 23, 2009

Related U.S. Application Data

(63) Continuation of application No. 10/917,338, filed on Aug. 13, 2004, now Pat. No. 7,627,758.

(51) Int. Cl.
  *G06F 7/04* (2006.01)
(52) U.S. Cl.
  USPC .................................. 726/4; 726/25; 713/168
(58) Field of Classification Search ................ 726/4, 25; 713/168
  See application file for complete search history.

(56) References Cited

U.S. PATENT DOCUMENTS

| | | | |
|---|---|---|---|
| 6,658,571 B1 * | 12/2003 | O'Brien et al. ................. | 726/26 |
| 6,986,061 B1 | 1/2006 | Kunzinger | |
| 7,174,456 B1 | 2/2007 | Henry et al. | |
| 7,225,460 B2 * | 5/2007 | Barzilai et al. .................... | 726/1 |
| 7,448,067 B2 * | 11/2008 | Yadav ............................... | 726/1 |
| 7,584,503 B1 | 9/2009 | Palmer et al. | |
| 2003/0177389 A1 | 9/2003 | Albert et al. | |
| 2004/0064727 A1 | 4/2004 | Yadav | |
| 2004/0230797 A1 | 11/2004 | Ofek et al. | |
| 2006/0075263 A1 | 4/2006 | Taylor | |
| 2007/0101405 A1 | 5/2007 | Engle et al. | |

OTHER PUBLICATIONS

RSA Press Release, Nov. 8, 2004; RSA Security and Juniper Networks Extend Strategic Partnership to Offer New Federated Identity Management Solution, 3 pages.

Co-pending U.S. Appl. No. 10/917,338, filed Aug. 13, 2004 entitled "Method and System for Performing a Security Check", 46 pages.

\* cited by examiner

*Primary Examiner* — Amare F Tabor
(74) *Attorney, Agent, or Firm* — Harrity & Harrity, LLP

(57) ABSTRACT

An access request is transmitted from a first device to a second device causing one or more security functions to be executed on the first device. Whether to grant the access request is based on a result of the executed one or more security functions.

14 Claims, 9 Drawing Sheets

METHOD AND SYSTEM FOR PERFORMING A SECURITY CHECK

This application is a continuation of U.S. patent application Ser. No. 10/917,338 filed Aug. 13, 2004, the disclosure of which is hereby incorporated by reference.

TECHNICAL FIELD

Systems and methods consistent with the principles of the invention relate generally to computer security and, more particularly, to performing checks on a processing device before permitting the processing device to access a network.

BACKGROUND OF THE INVENTION

A corporation may protect its network in a number of different ways. For example, a corporate security infrastructure may include firewalls, intrusion detection, Uniform Resource Locator (URL) filtering, content inspection, etc. Further, corporations may enforce certain procedures that must be followed by employees who wish to use processing devices to access the corporate network from within the office.

Telecommuters, mobile employees, remote business partners, etc. may desire remote access to a corporate network. At least some of these users may wish to access the corporate network over the Internet or via another network or group of networks. However, because these users do not access the corporate network via the corporate security infrastructure, the users' processing devices may be compromised. For example, a user's processing device may have been infected with a virus while surfing the Internet for personal or business use. Further, the user's processing device may be executing malevolent software, such as, for example, a key-logging process, which may capture log-in identifiers (IDs), such as User IDs, and passwords entered by the user for access to the corporate network, as well as other networks, and may send the captured IDs and passwords to a hacker.

Viruses, other malevolent software, or hackers with stolen passwords may cause a corporate network to be compromised. For example, hackers may gain access to confidential corporate information stored on network devices or viruses may cause the loss of use of corporate information technology (IT) assets for some period of time, thereby having a negative effect on productivity. Further, the loss of confidential information may lead to lost profits and/or loss of reputation in the marketplace. Therefore, to better protect corporate network resources, corporations may attempt to either block remote access to corporate IT assets or check the security of processing devices used for remote access before permitting remote users to continue to access sensitive IT assets.

SUMMARY OF THE INVENTION

In a first aspect, a method is provided. The method may include transmitting an access request from a first device to a second device, causing one or more security functions to be executed on the first device, and determining whether to grant the access request based on a result of the executed one or more security functions.

In a second aspect, a network device is provided. The network device may include storage, including a group of instructions, and a processor operable to execute the instructions included in the storage such that, when the processor executes the instructions, the processor is configured to receive an access request from a user device, cause at least one security function to be executed on the user device, and determine whether to grant the access request based on a result of the executed at least one security function.

In a third aspect of the invention, a first processing device operable to connect to a remote network via a second processing device is provided. The first processing device may include a processor and a memory including instructions for the processor such that, when the processor executes the instructions, the processor is configured to transmit an access request, receive security software in response to the transmitting, execute the received security software to perform at least one security function, and report a result of the executing to the second processing device.

In a fourth aspect of the invention, a computer-readable medium having a data structure is provided. The data structure may include a portion of a URL and policy information that identifies one or more security functions to be executed on a device requesting the URL.

In a fifth aspect of the invention, a computer-readable medium having a data structure is provided. The data structure may include user identifying information and policy information that identifies one or more security functions to be executed on a remote device from which the user identifying information is received.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

Overview

Figure 1:
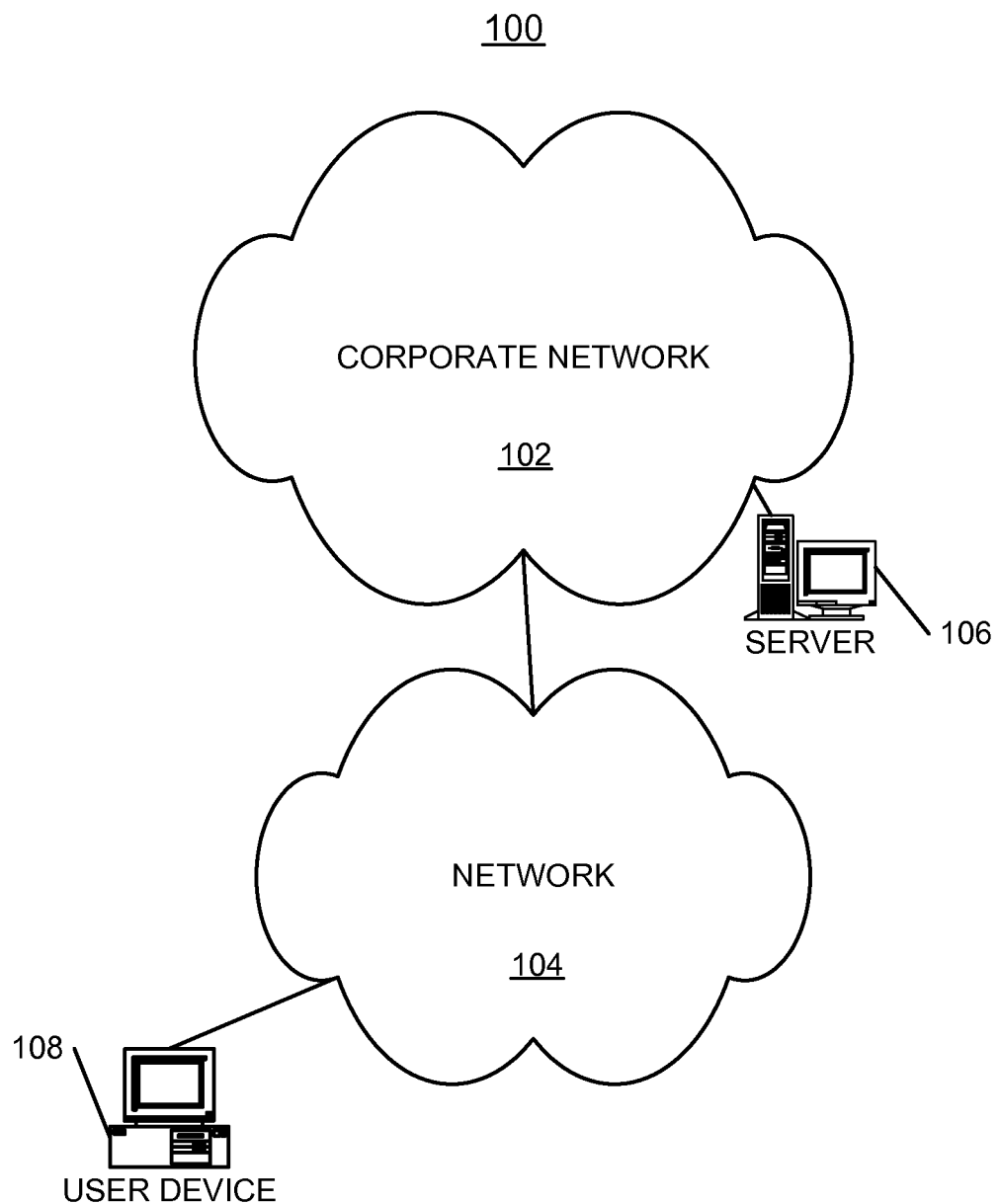
FIG. 1 illustrates an exemplary system consistent with principles of the invention.

FIG. 1 illustrates an exemplary system 100 in which apparatuses and methods consistent with the principles of the invention may be implemented. System 100 may include a corporate network 102, a second network 104, a server 106, and a user device 108.

Corporate network 102 may include one or more networks, such as a local area network (LAN), a wide area network (WAN), or the like. In one implementation, corporate network 102 may be a secure network (e.g., network 102 may be protected by network firewalls and/or security procedures).

Network 104 may include a LAN, a WAN, a telephone network, such as the Public Switched Telephone Network (PSTN), a wireless network, an intranet, the Internet, a similar or dissimilar network, or a combination of networks. In one implementation, network 104 may not be a secure network.

User device 108 may be a processing device, such as a personal computer (PC) or a handheld processing device. In some implementations, user device 108 may execute web browser software, such as, for example, Microsoft Internet Explorer, available from Microsoft Corporation of Redmond, Wash., for communicating with server 106 via networks 104 and 102. In some implementations, user device 108 may establish a secure session with server 106 via, for example, a virtual private network (VPN), secure socket layer (SSL), or any other secure means.

Server 106 may include server entities that reside in corporate network 102 and may be accessed remotely by user device 108 via networks 104 and 102. Server 106 may include one or more processing devices through which remote users may establish a session to gain access to corporate network 102. In implementations consistent with the principles of the invention, server 106 may be configured to cause a security checker and a security module to be stored on user device 108. Once stored and installed on user device 108, the security checker may execute the security module, which may perform a security check or scan of user device 108 and report results of the scan to server 106.

In response to receiving the results of scanning or checking user device 108, server 106 may grant full access, grant limited access, or deny access to server 106 from user device 108.

FIG. 1 illustrates an exemplary system. System 100 may have more or fewer components than shown in FIG. 1. For example, system 100 may include multiple servers 106 serving multiple user devices 108.

Figure 2:
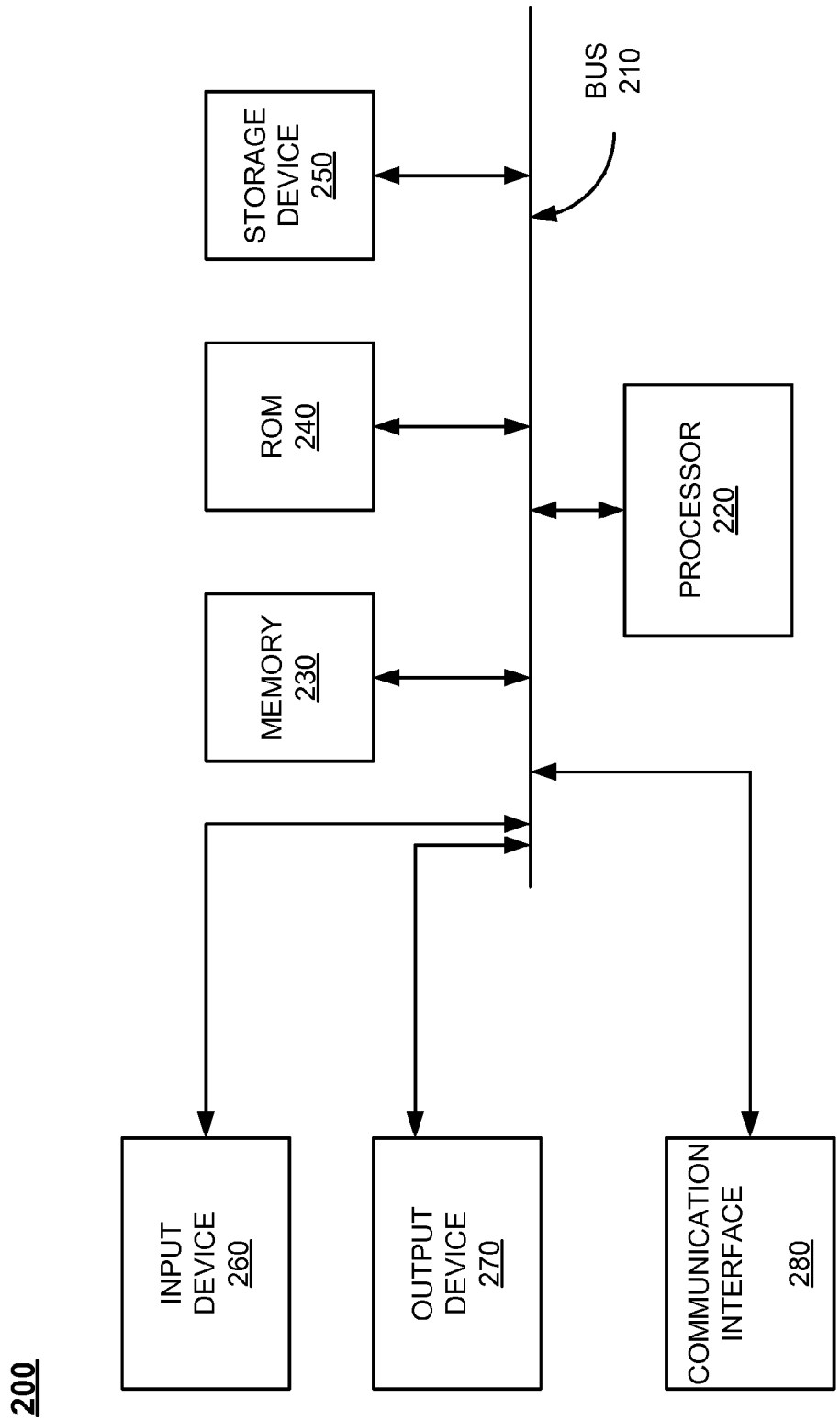
FIG. 2 is a functional block diagram of a processing device that can be used to implement a server and/or a user device shown in FIG. 1.

FIG. 2 is a functional block diagram that illustrates a processing device 200 that may be used to implement user device 108 and/or server 106. Device 200 may include a bus 210, a processor 220, a memory 230, a read only memory (ROM) 240, a storage device 250, an input device 260, an output device 270, and a communication interface 280. Bus 210 may permit communication among the components of device 200.

Processor 220 may include one or more conventional processors or microprocessors that interpret and execute instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of magnetic or optical recording medium and its corresponding drive, such as a magnetic disk or optical disk and its corresponding disk drive.

Input device 260 may include one or more mechanisms that permit a user to input information to system 200, such as a keyboard, a mouse, a pen, a biometric mechanism, such as a voice recognition device, etc. Output device 270 may include one or more mechanisms that output information to the user, including a display, a printer, one or more speakers, etc. Communication interface 280 may include any transceiver-like mechanism that enables device 200 to communicate via a network. For example, communication interface 280 may include a modem or an Ethernet interface for communicating via network 102 or 104. Alternatively, communication interface 280 may include other mechanisms for communicating with other networked devices and/or systems via wired, wireless or optical connections.

Device 200 may perform functions in response to processor 220 executing sequences of instructions contained in a computer-readable medium, such as memory 230. A computer-readable medium may include one or more memory devices and/or carrier waves. Such instructions may be read into memory 230 from another computer-readable medium, such as storage device 250, or from a separate device via communication interface 280.

Execution of the sequences of instructions contained in memory 230 may cause processor 220 to perform certain acts that will be described hereafter. In alternative implementations, hard-wired circuitry may be used in place of or in combination with software instructions to implement the present invention. Thus, the present invention is not limited to any specific combination of hardware circuitry and software.

Exemplary Processing

Figure 3:
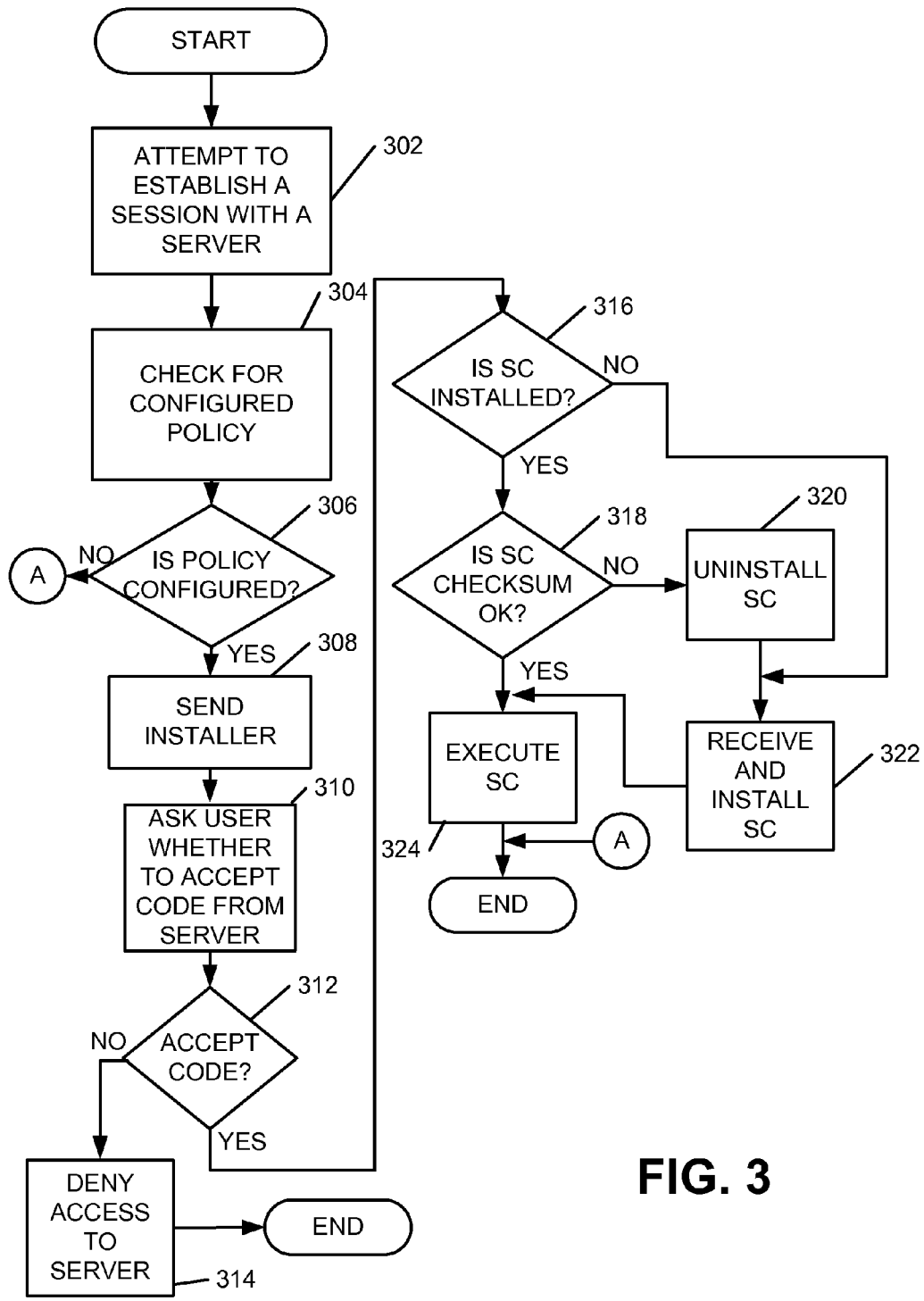
FIG. 3 is a flowchart that illustrates exemplary processing within the system of FIG. 1 consistent with the principles of the invention.

FIG. 3 is a flowchart that illustrates exemplary processing in system 100, consistent with the principles of the invention. The process may begin with a remote user attempting to establish a session with server 106 from user device 108 via networks 102 and 104 (act 302). In some implementations consistent with the principles of the invention, the user may attempt to establish a secure session that uses a protocol, such as, for example, Secure Socket Layer (SSL), which uses a private key to encrypt data transferred over the SSL session, or a virtual private network (VPN). In one implementation, the user may enter a uniform resource locator (URL) on a browser associated with user device 108 in order to establish the session with server 106. The URL may be an address of, for example, an employee page, a business partner page, a corporate officer page, a client page, or any other type of page, which may be provided by server 106. Server 106 may receive the URL provided by the user, and may check a configured authorization policy associated with the URL (act 304). In one implementation, a configured authorization policy may, for example, require user devices 108 requesting a particular URL, such as, "www.employee123.com," to satisfy a particular policy, such as, "antivirus." The policy, "antivirus," may be associated with a security module, such as, for example, an antivirus scanner. Thus, using the above example, remote user devices 108 that send a URL of "www.employee123.com" to server 106 may be required to undergo a security check according to a security policy, "antivirus," which, in this case, is an antivirus scan. Thus, server 106 may determine the authorization policy and corresponding security module based on the particular URL provided by user device (act 304).

Figure 4:
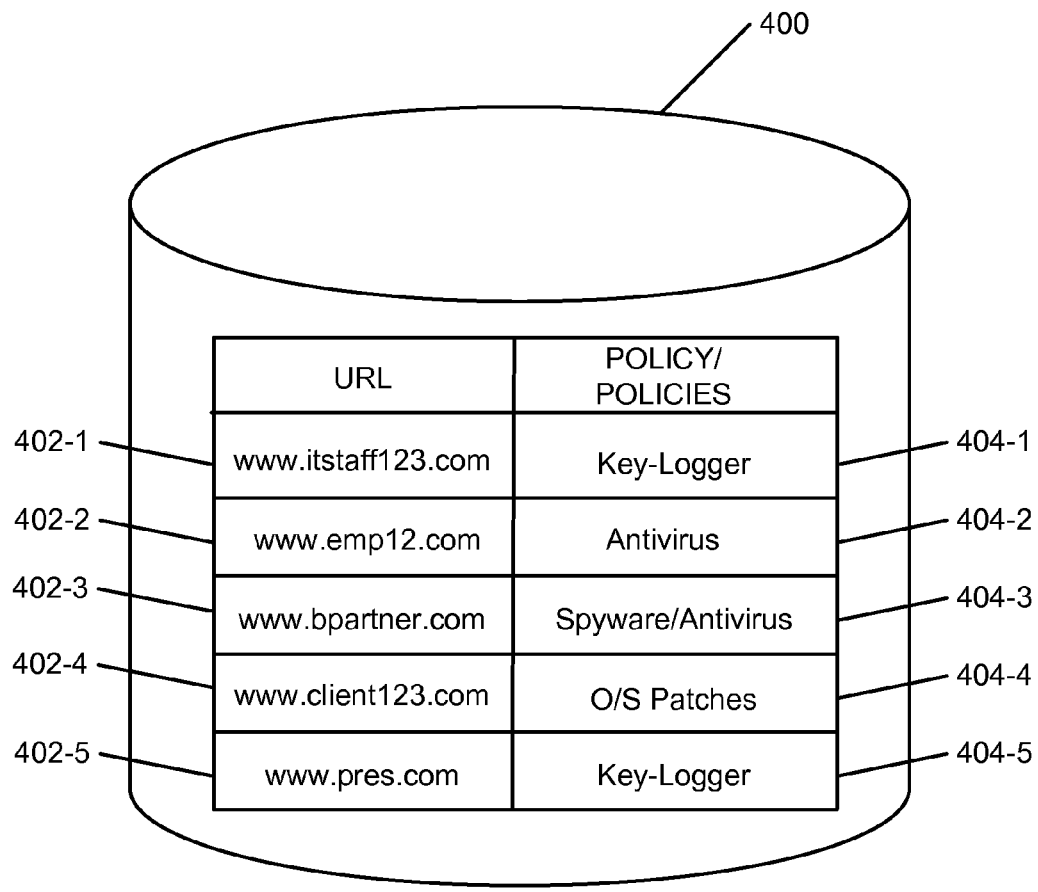
FIG. 4 illustrates an exemplary database and data structure that may be used in implementations consistent with the principles of the invention.

FIG. 4 illustrates an exemplary database 400 that may, for example, be stored in memory 230 or storage device 250 of server 106 in an implementation consistent with the principles of the invention. Database 400 may include a data structure including rows of URLs 402-1 through 402-5 and corresponding policy or policies 404-1 through 404-5. For example, when user device 108 provides the URL, www.itstaff123.com to server 106, server 106 may use the data structure to find entry 402-1 and its corresponding policy 404-1, which has a value of Key-Logger, indicating that a security check associated with policy, Key-Logger, should be performed on user device 108. In this case, a keystroke logging process checker may be associated with policy Key-Logger.

In other implementations, a portion of a URL address may be included in database 400. For example, a received URL that includes "bpartner" may be associated with one or more policies in database 400. With reference to FIG. 4, entry 402-3 may be associated with multiple policies, such as Spyware/Antivirus 404-3. Thus, a security check associated with policies Spyware and Antivirus may be performed on user device 108. The check may include a spyware scan and an antivirus scan.

Returning to FIG. 3, server 106 may determine whether a policy is associated with the URL provided by the user (act 306). If no policy is associated with the URL, server 106 may not perform any security checking of user device 108. If, on the other hand, a policy is associated with the URL, server 106 may send an installer to user device 108 (act 308). An exemplary installer may be, for example, an ActiveX installer available from Microsoft Corporation of Redmond, Wash.

The installer on user device 108 may cause a message to be displayed on a display of user device 108 asking the user to accept software from server 106 (act 310). The installer executing on user device 108 may receive the user's answer and may determine whether the user indicated that he or she accepts the software from server 106 (act 312). If the user indicated that he or she will not accept the software, server 106 may be informed and server 106 may deny the user access to server 106 (act 314). In some implementations consistent with the principles of the invention, a message may be displayed to the user, via user device 108, indicating that the user will be denied access unless he or she indicates that the software from server 106 is accepted.

If the user accepts software from server 106, the installer may then determine whether a security checker (SC) is already installed (act 316). The installer may make this determination by, for example, checking registration keys stored on user device 108. If a security checker is installed, then the installer may compare a checksum of the installed security checker with that of the security checker to be loaded by server 106 (act 318). In some implementations consistent with the principles of the invention, parameters, such as the security checker checksum, may be sent to user device 108 with the installer. If the checksums do not match, then the installer may uninstall the security checker currently installed on user device 108 (act 320), request the new security checker from server 106, and receive and install the new security checker (act 322). Otherwise, if the checksums match, then the installed security checker may be executed on user device 108 (act 324).

Figure 5:
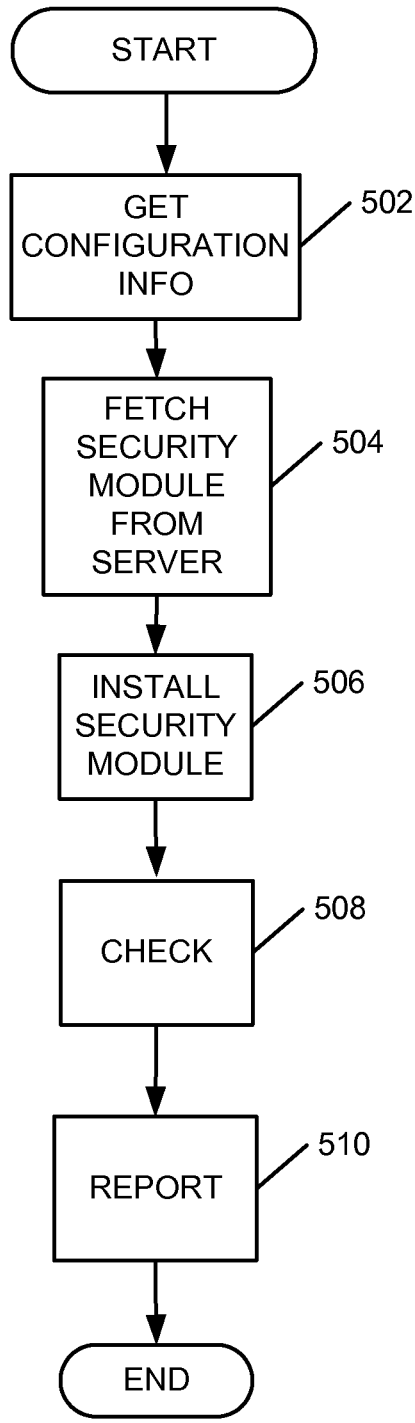
FIG. 5 is a flowchart that illustrates exemplary processing of a security checker.

FIG. 5 is a flowchart that illustrates processing of an exemplary embodiment of a security checker executing on user device 108. As will be explained below, the security checker may provide a framework by which the security module, which can include security scanning software (for example, antivirus software, spyware detector software, key logger detector software, etc.), may be executed and by which the security module may report results to server 106. Once the security checker is installed and begins executing, the security checker may request configuration information from the installer (act 502). The configuration information may include, for example, the security module, checksums of software modules to be loaded, configured time intervals between repeated security checks, and any other information necessary to perform the desired security check of user device 108.

The configuration information may be stored on server 106 in an archive file. When the installer is loaded into user device 108, the installer may include parameters such that the installer may later request the proper security checker, the security module, and any other needed files, such as operating system dependent files.

Figure 6:
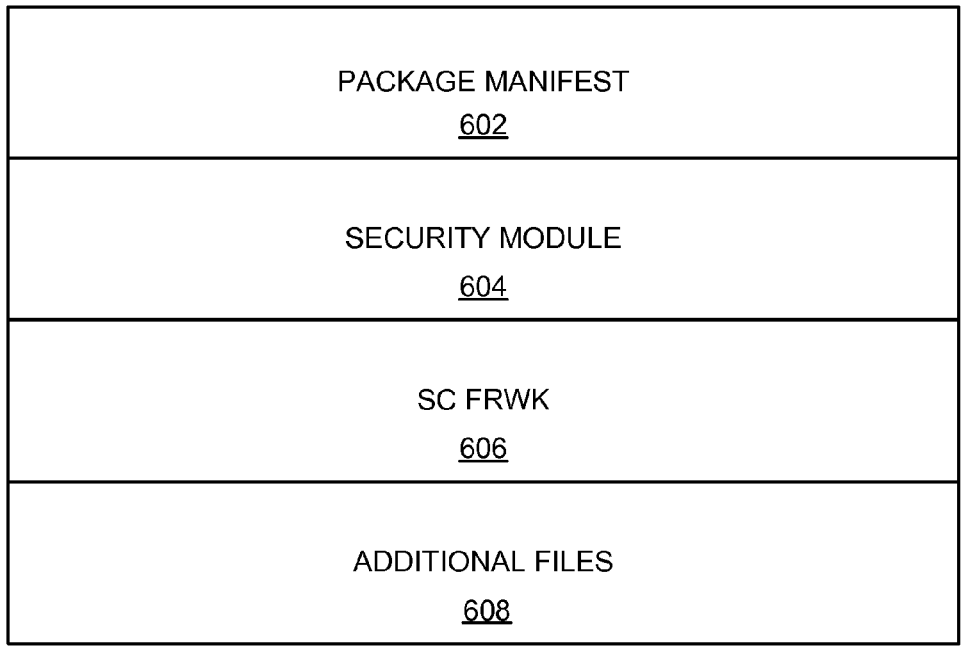
FIG. 6 illustrates an exemplary format of a file that includes configuration information.

FIG. 6 illustrates an exemplary format of an archive file that may include the configuration information. The archive file may be in a compressed format, such as, for example, Java ARchive (JAR) format, which is well known to those of ordinary skill in the art. The archive file may include a package manifest 602, a security module 604, a security checker (SC) with a framework (FRWK) 606, and additional files 608.

Package manifest 602 may include a package definition, which may include the name of the security module 604 as well as other information. For example, the package definition may include a security checker (SC) interface version number, such as, for example, 1.0, the name of a provider of the security module, such as, for example, SnakeOil, Inc., the name of a file including the security module, for example, foo.bar, and checksums, such as, for example, an MD5-Digest or any other suitable type of checksum for each entry in the archived file, for example, a checksum for SC FRWK 606, security module 604, and additional files 608. The package definition may also include a configured time interval indicating a number of time units between repeated security checks of user device 108. The time units may be in seconds, minutes, hours or any other convenient time unit.

Security module 604 may include one or more names of policies supported by the security module, such as, for example, spyware, antivirus, key-logger, or trojans. In one implementation, each policy may include a number of entries. The entries may include keywords that instruct server 106 how to interpret a report provided by the security module after performing a security check or scan on user device 108.

SC FRWK 606 may include the security checker code, and a framework, which may include an interface for the security checker to call routines of the security module, and an interface by which the security module may call routines to perform certain functions on user device 108. This is described in more detail below.

Additional files 608 may include signature files, such as, for example, virus signature files for an antivirus program, or routines that may be operating system dependent, for example, one or more routines that the security module may use when executing on a user device that uses a particular operating system, such as, for example, the Windows XP® operating system, available from Microsoft Corporation of Redmond, Wash.

Figure 7:
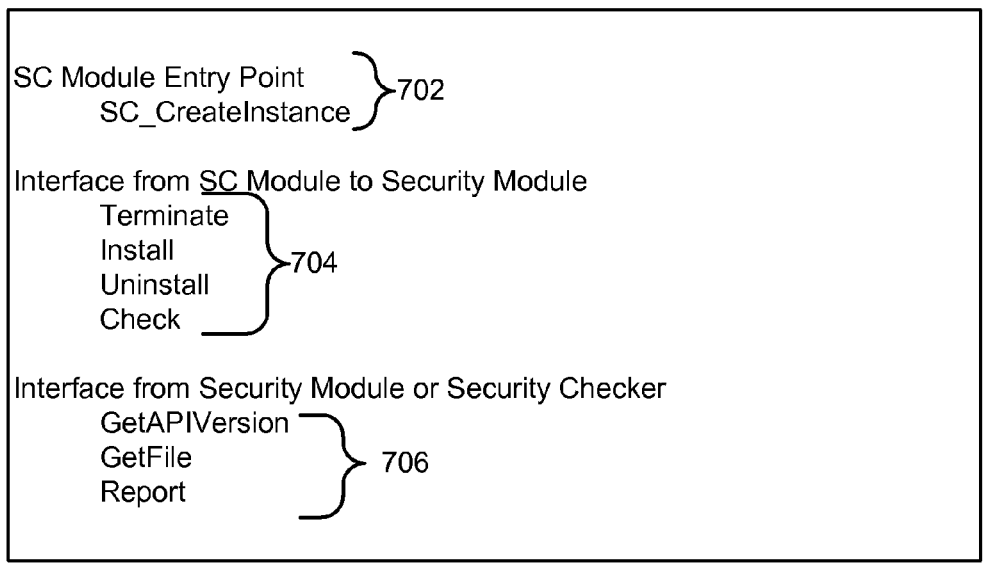
FIG. 7 illustrates an exemplary security checker framework consistent with the principles of the invention.

FIG. 7 illustrates exemplary security checker framework or interface definitions that may be used in implementations consistent with the principles of the invention. The interface definitions may include an entry point 702 for the security checker, an interface 704 from the security checker to the security module, and an interface 706 from the security module to the security checker.

Security checker entry point 702, may be named, for example, SC_CreateInstance. In one implementation, SC_CreateInstance may be a function, defined within the security module, which may be called to initialize entry points used by both the security checker and the security module. This is described in more detail below.

Interface 704 from the security checker to the security module may include addresses of entry points within the security module, as well as other functions. For example, the security checker may call a Terminate routine, a routine within the security module to execute and perform any required cleanup operations. After the security module is installed, the security checker may call an Install routine, a routine within the security module to perform other installs related to the security module on user device 108. When the security checker calls an Uninstall routine, the security checker may uninstall the security module and related software. When the security checker calls a Check routine, a security scan of user device 108 may be performed. The security scan may be one or more of an antivirus scan, a key-logger scan, etc.

Interface 706 from the security module to the security checker may include addresses of entry points of functions within the security checker that can be called from the security module. For example, the security module may call a GetAPIVersion routine to obtain a version of the security checker, for example, 1.0, from server 106. This may be useful when multiple versions of the security checker exist, which may include different entry points and capabilities. Thus, the security module may check the security checker version number to determine which entry points and functions are available. The security module or the security checker may call a GetFile routine when a particular file is to be retrieved from server 106. The GetFile routine may include parameters, such as, for example, full source and destination paths, indicating, respectively, a particular folder and file on a medium such as, for example, a disk, from which to get the file on server 106 and a particular folder and file on, for example, a disk, where the file will be stored on user device 108. Thus, the GetFile routine may request and receive the file from server 106. The security module may call a Report routine, after performing a security scan of user device 108, to report the results of the security scan to server 106. The report may include a Boolean value indicating whether the scan was successful, a policy name associated with the security module, such as, for example, antivirus, key-logger, spyware, etc., and a description, which may vary depending on the policy/policies associated with the security module. In one implementation, a report for an antivirus scan may identify names of viruses found, a report for a spyware scan may indicate whether spyware was found on user device 108, and a report for missing software patches may indicate which software patches are missing.

Returning to FIG. 5, when the installer is loaded into user device 108, server 106 may provide parameters, including information about the archive file, with the installer. After retrieving configuration information, the security checker may fetch the security module from server 106 by calling GetFile (act 504) via the security checker framework. The security checker may then use the installer to install the security module (act 506). The security checker may then call Check, through interface 704, to cause the security module to execute on user device 108 and perform, for example, a security scan of user device 108 (act 508). A policy may be associated with the security module. Thus, for example, if policy Antivirus is associated with a security module, the security module associated with the Antivirus policy may perform a scan of memory and/or files on user device 108. The security module may call Report, through interface 706, to report the results of the scan to server 106 (act 510). The security checker may call Terminate through interface 704 to perform any cleanup tasks according to a routine within the security module.

After being installed by the security checker, the security module may be executed and begin by performing checks to determine whether any additional files may be needed from server 106. For example, the security module may need certain files for particular operating systems or signature files for an antivirus scan. If additional files are needed, the security module may call the GetFile routine, through interface 706, to request and receive the needed file or files from server 106 and may then install the file or files.

As mentioned above, after performing a security scan on user device 108, the security module may send a report to server 106, by calling Report via interface 706 to indicate a result of the scan to server 106. The report may vary depending on the type of scan performed. For example, a report after performing an antivirus scan may indicate that one or more viruses were found on user device 108 and the report may provide a list of viruses found. Server 106 may receive the report and determine a level of access to which user device 108 will be granted based on the report. The levels of access may include, for example, no access, limited access, or full access. In one implementation, server 106 may deny access to user device 108 if the report indicates that user device 108 includes a virus. In an alternative implementation, server 106 may grant limited or full access to user device depending on the particular virus(es) identified in the report.

Security Checker/Security Module Interface

Figure 8:
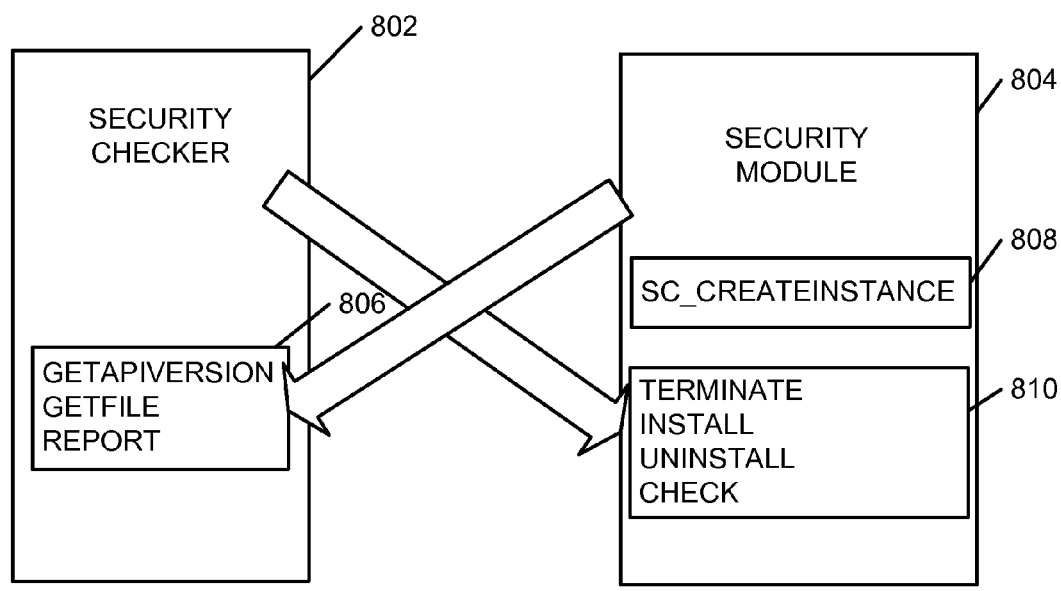
FIG. 8 illustrates the security checker framework or interfaces of FIG. 7 in more detail.

FIG. 8 illustrates the framework or interfaces of FIG. 7 in more detail. As can be seen in FIG. 8, the interfaces may provide a way for security checker 802 and security module 804, executing on user device 108, to work with one another.

In an implementation consistent with the principles of the invention, security checker 802 begins executing on user device 108 and may search for an address of a particular entry point within security module 804, for example, entry point SC_CreateInstance. Security checker 802 may then call the SC_CreateInstance function in security module 804 and may pass, as parameters, addresses of functions that reside in security checker 802. In one implementation, the addresses may be addresses of the GetAPIVersion, GetFile, and Report functions 806 described earlier.

SC_CreateInstance 808 may use the passed parameters to store addresses 806 in a security module interface table (not shown) within security module 804. Security module 804 may obtain addresses of functions within security module 804 and may pass the addresses to security checker 802, which may store the addresses in a security checker interface table (not shown). In one implementation, the addresses may be addresses 810, which may include addresses of Terminate, Install, UnInstall, and Check functions, described earlier.

In an alternative implementation, security checker 802 may pass an address of a table, which may include addresses of functions, such as, for example, GetAPIVersion, GetFile, and Report, to security module 804. Similarly, in an alternative implementation, SC_CreateInstance 808 may pass an address of a table, which includes addresses of functions that reside in security module 804, to security checker 802. The functions may include, for example, Terminate, Install, UnInstall, and Check.

Using the above-described framework or interfaces, security checker 802 may call certain functions within security module 804 and security module 804 may call certain functions within security checker 802.

Security Checker Configuration on Server

Server 106 may be provided with an administrative interface to provide an administrator the ability to configure one or more security modules and policies. Each security module may be associated with one or more policies. For example, an administrator may associate a security module with a policy for checking user device 108 for the presence of viruses. The administrator may also use the administrative interface to associate the policy with users. For example, the administrator may associate a policy with users who remotely access a particular web page, for example, an employee web page. The administrator may also configure a policy to be associated with a particular user or a group of users. For example, employees in the "Engineering" group may be associated with a policy that is configured to execute a security module to check for the presence of specific software in user device 108. Employees in the "Marketing" group, for example, may be associated with a policy that is configured to execute a security module that scans user device 108 for the presence of a key-logger.

Other types of policies may be associated with a security module to perform various other checks, such as, for example, checking a patch level of the operating system (this may be achieved by, for example, checking registration keys), checking for the presence of firewall software, checking a patch level of certain software modules, etc.

Although examples provided above show a one-to-one correspondence between a policy and a security module, implementations consistent with the principles of the invention may permit an administrator to configure a security module to be associated with multiple policies. For example, a security module may be associated with an antivirus policy and a spyware policy, which may indicate that the security module is capable of performing checks, on user device 108, associated with the antivirus and spyware policies.

The administrative interface may provide the administrator with a way to specify actions that are permitted after user device 108 is scanned. For example, based on the report to server 106, the user may be given unlimited access (for example, no viruses found), the user may be permitted access to only certain resources of network 102 (for example, no harmful viruses found), or the user may denied any access (for example, harmful viruses found).

In some implementations consistent with the principles of the invention, the administrative interface may provide the administrator a capability of configuring a security module associated with one or more policies to periodically perform a check associated with the one or more policies. For example, a security module may be configured to perform an antivirus scan of user device 108 every 30 minutes or some other time interval. Further, in some implementations, when the security module periodically performs the check, a report may be sent to server 106 only when the report differs from a previous report.

In implementations consistent with the principles of the invention, the security checker may periodically check whether the configured authorization policy associated with a user or user group has changed on server 106. If the security checker executing on user device 108 detects a configuration change, the security checker, the security module, and any associated files may be uninstalled on user device 108 and a new security checker, security module, and associated files may be loaded and installed.

Associating a User with a User Group

FIGS. 3 and 5 describe the loading and installing of the security checker and a security module associated with a configured policy, and the checking of user device 108. In one implementation, these acts can be performed before a user has identified himself via, for example, a user ID and password. For example, once user device 108 has successfully been checked by the security checker, server 106 may prompt the user for some type of indication that the user is authorized to access corporate network 102, for example, a user ID and password, or any other form of authentication. Server 106 may have access to a database that in one implementation may include, for example, a group of user IDs, associated passwords, and a corresponding name of a user group to which each user ID belongs, if any. The database may also include a name of a policy or policies associated with the user ID or user groups, as well as security modules associated with one or more policies.

Figure 9:
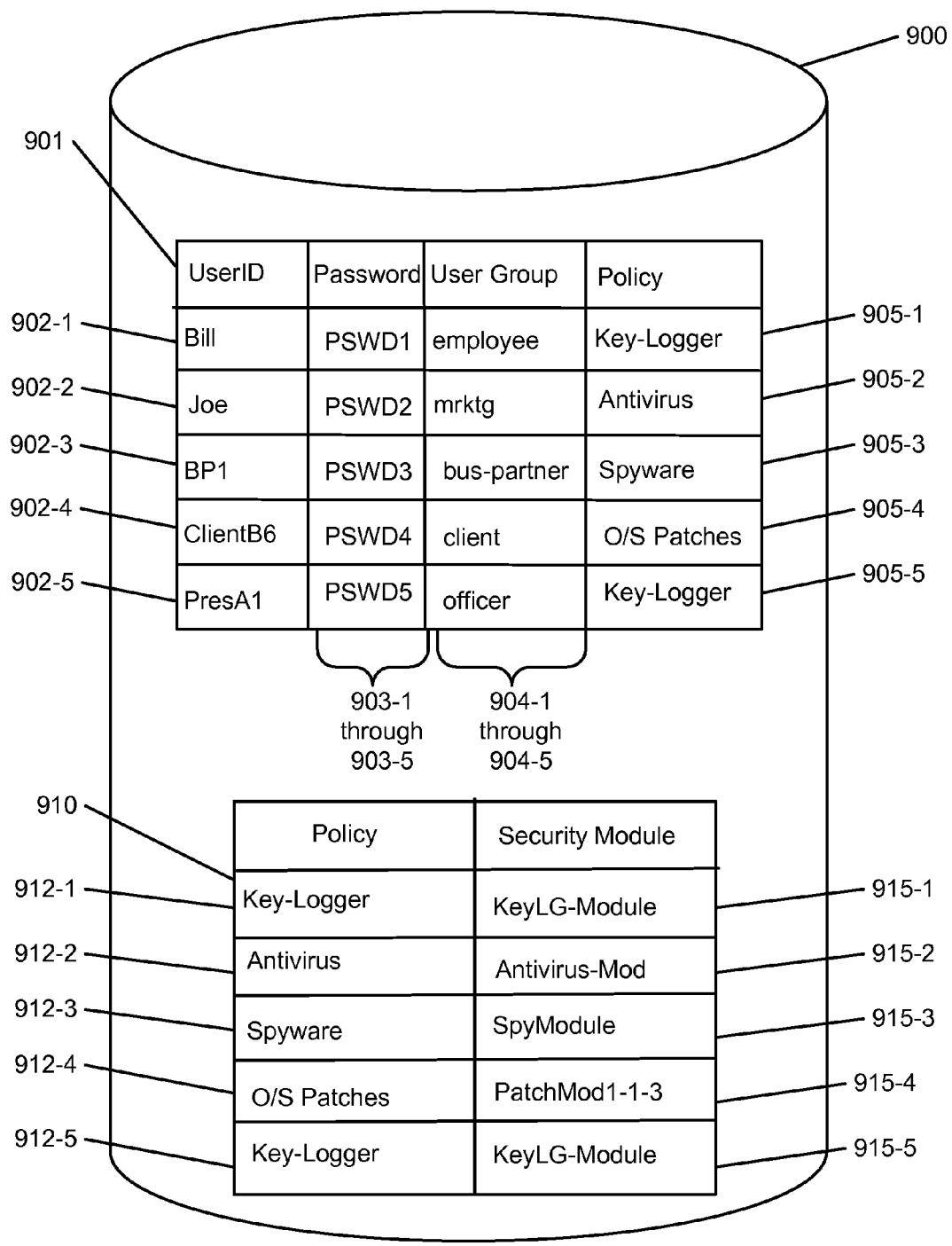
FIG. 9 illustrates an exemplary database and data structures that may be used in implementations consistent with the principles of the invention.

For example, FIG. 9 illustrates an exemplary database 900 that may be stored in memory 230 or storage device 250 of server 106 in an implementation consistent with the principles of the invention. Database 900 may include data structures 901 and 910. Data structure 901 may include user IDs 902-1 through 902-5, corresponding passwords, 903-1, through 903-5, corresponding user groups, 904-1 through 904-5, and corresponding associated policies, 905-1 through 905-5. Thus, for example, user ID "Bill" has a password of "PSWD1," is associated with user group "employee," and is associated with policy "Key-Logger."

Data structure 910 may include policies 912-1 through 912-5 and corresponding names of security modules 915-1 through 915-5. Thus, for example, policy "Key-Logger" is associated with security module "KeyLG-Module."

It should be noted that data structures 901 and 910 are exemplary and may contain more or fewer entries than shown in FIG. 9.

Figure 10:
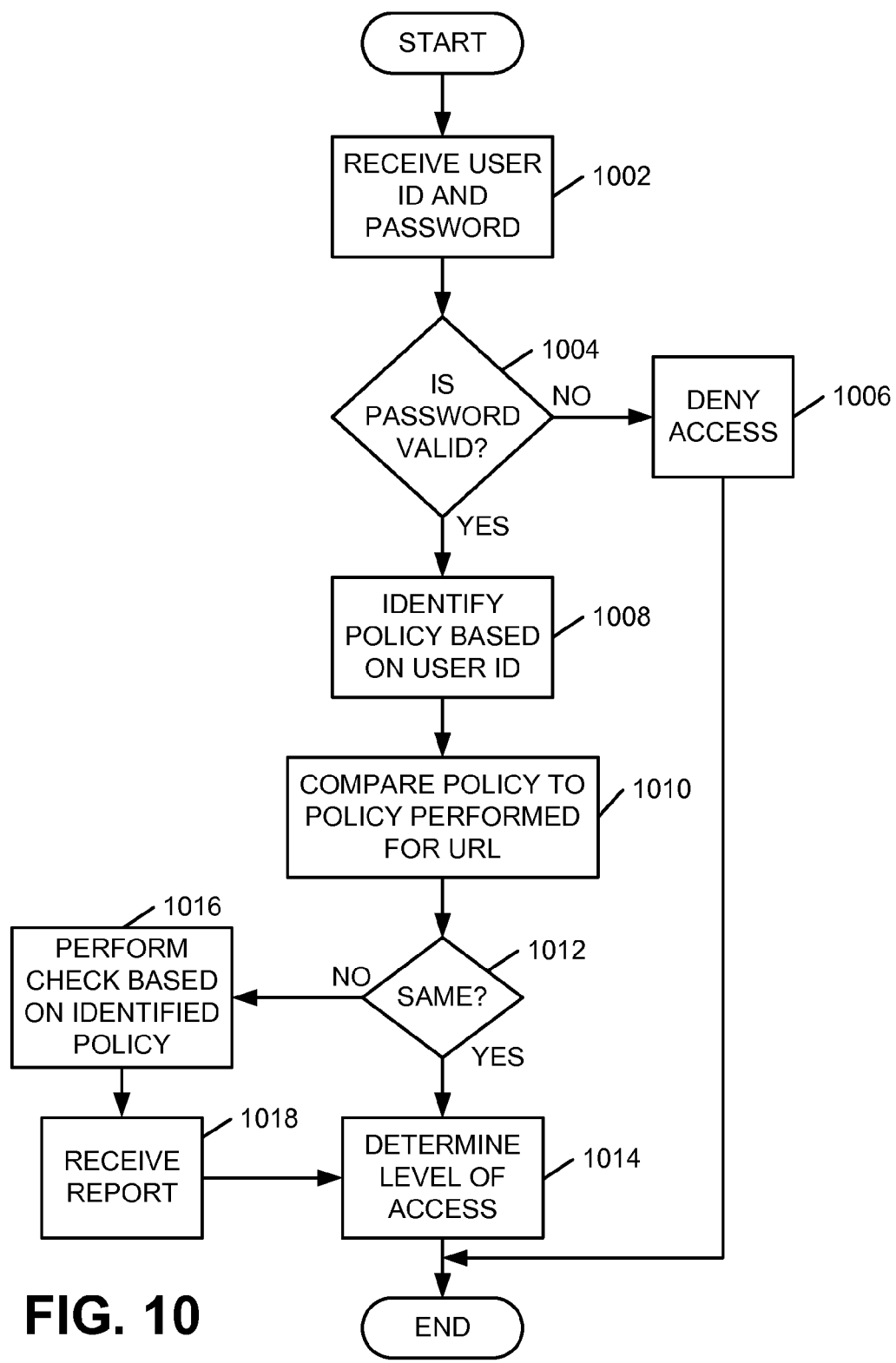
FIG. 10 is a flowchart that illustrates exemplary processing of a server.

FIG. 10 is a flowchart that illustrates exemplary processing on server 106 after user device 108 provides identifying information, such as, for example, a user ID and password, to server 106. Server 106 may receive the user ID and password (act 1002) and determine whether a valid user ID and password were provided (act 1004). Server 106 may perform this check by checking data structure 901. If server 106 determines that the password is invalid, then server 106 may deny access to user device 108 (act 1006).

Otherwise, server 106 may identify one or more policies associated with the user ID (act 1008). Server 106 may identify the policies by finding the policy or policies associated with the user ID via data structure 901. Server 106 may compare the policy or policies with the policy or policies associated with the previously requested URL, as described above with respect to FIG. 3 (act 1010). Server 106 may determine whether the policies are the same (act 1012). If the policies are the same, then, instead of performing the same check that may have been performed only moments before, server 106 may determine the level of access according to the last report received (act 1014), which was the report from the check or scan performed for the URL.

If server 106 determines that the policy or policies do not match the policies associated with the URL, then server 106 may cause a security scan or check associated with the current policy or policies to be performed (act 1016). Sever 106 may determine which security module to use by checking data structure 910. After the scan or check is performed, server 106 may receive a report of a result of the check or scan from user device 108 (act 1018) and may determine a level of access based on the report (act 1014). As discussed previously, the level of access may be, full access, limited access, or no access, based on the report.

Variation

Although a URL is described as a way of determining a policy and a check or scan to perform on user device 108, in an alternative implementation consistent with principles of the invention a particular URL, such as, for example, "www.server.com" may be used by user device 108 to contact server 106. After contacting server 106, server 106 may query user device 108 for a user group ID. The user group ID may be a sequence of alphanumeric characters that is associated with one or more policies and a security module, similar to the way a URL may be associated with one or more policies and a security module. A particular user group ID may be used by users of a particular user group. In response, to receiving the query from server 106, user device 108 may display a query to the user requesting the user group ID. Once the user supplies the user group ID, user device 108 may send the user group ID to server 106. Thus, for example, user group ID "emp112345" may be associated with policy, "Antivirus," which may cause server 106 to initiate an antivirus scan of user device 108. Server 106 may determine a level of access based on a reported result of the scan or check.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while certain aspects have been described as implemented in software, other configurations may be possible.

While series of acts have been described with regard to FIGS. 3, 5, and 10 the order of the acts is not critical. Moreover, non-dependent acts may be performed in parallel.

In addition, acts described above as being performed by one device/subsystem may alternatively be performed by another device/subsystem. Further, in still other alternative implementations, a single device/subsystem may perform all of the acts described above as being performed by a number of devices/subsystems. No element, act, or instruction used in the description of the implementations consistent with the principles of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the following claims and their equivalents.

What is claimed is:

1. A method performed by a server, the method comprising:

receiving, based on receiving an indication of a uniform resource locator (URL) entered by a user of a remote device, an indication that the user is attempting to establish a session with the server;

using, by the server, the URL to retrieve a first authorization policy associated with the session from a first data structure;

causing, by the server, a first security checker, associated with the first authorization policy, to be executed on the remote device;

receiving, at the server, a user ID associated with the user;

identifying, by the server, a second authorization policy associated with the user ID;

determining, by the server device, that the second authorization policy is not the same as the first authorization policy;

causing, by the server, a second security checker, associated with the second authorization policy, to be executed on the remote device when the second authorization policy is not the same as the first authorization policy; and determining, by the server, a level of access for the user based on a result of the execution of the first security checker or the second security checker.

2. The method of claim 1, where identifying the second authorization policy associated with the user ID comprises:
using the user ID to look up the second authorization policy in a second data structure.

3. The method of claim 1, further comprising:
receiving a first report associated with execution of the first security checker;
receiving a second report associated with execution of the second security checker; and
determining the level of access based on the first report or second report.

4. The method of claim 1, further comprising:
determining a level of access for the user based on a result of the execution of the first security checker when the second authorization policy is the same as the first authorization policy.

5. The method of claim 1, further comprising:
determining a level of access for the user based on a result of the execution of the second security checker when the second authorization policy is not the same as the first authorization policy.

6. A system comprising:
a server to:
receive, based on receiving an indication of a uniform resource locator (URL) entered by a user of a remote device, an indication that the user is attempting to establish a session;
retrieve, using the URL, a first authorization policy, associated with the session, from a first data structure;
cause a first security checker, associated with the first authorization policy, to be executed on the remote device;
receive a user ID associated with the user;
identify a second authorization policy associated with the user ID;
determine that the second authorization policy is not the same as the first authorization policy;
cause a second security checker, associated with the second authorization policy, to be executed on the remote device when the second authorization policy is not the same as the first authorization policy; and
determine a level of access for the user based on a result of the execution of the first security checker or the second security checker.

7. The system of claim 6, where when identifying the second authorization policy associated with the user ID, the server is to:
use the user ID to look up the second authorization policy in a second data structure.

8. The system of claim 6, where the server is further to:
receive a first report associated with execution of the first security checker;
receive a second report associated with execution of the second security checker; and
determine the level of access based on the first report or second report.

9. The system of claim 6, where the server is further to:
determine a level of access for the user based on a result of the execution of the first security checker when the second authorization policy is the same as the first authorization policy.

10. The system of claim 6, where the server is further to:
determine a level of access for the user based on a result of the execution of the second security checker when the second authorization policy is not the same as the first authorization policy.

11. A method comprising:
configuring, by a security system and based on an identity of a user attempting to access a remote device, a group of security modules to add one or more independently produced security modules,
the security modules, of the group of security modules, each implementing one or more security functions that are to be executed on the remote device,
the one or more independently produced security modules being produced by entities different than an entity that produced the security system,
the group of security modules including:
    a package manifest section that includes a name of a provider of the security module,
    a security module section that includes an identification of one or more policies supported by the security module, and
    a security framework section that includes a program interface for the security module;
transmitting, by the security system, the group of security modules to the remote device for execution of the one or more security functions implemented by the security modules at the remote device; and
determining, by the security system, whether to grant, to the user access to the remote device based on a result of the executed one or more security functions.

12. The method of claim 11, further comprising:
receiving a result of the one or more executed security functions.

13. The method of claim 11, where the group of security modules further includes:
a security module section that includes an identification of one or more policies supported by the security module.

14. The method of claim 11, where the security functions in the group of security modules relate to one or more of spyware detection, virus detection, or detection of missing software patches.

* * * * *